US007206005B2

(12) United States Patent
Yamashita et al.

(10) Patent No.: US 7,206,005 B2
(45) Date of Patent: Apr. 17, 2007

(54) IMAGE DISPLAY DEVICE AND METHOD FOR DISPLAYING MULTI-GRAY SCALE DISPLAY

(75) Inventors: Hiroshi Yamashita, Fujisawa-si (JP); Kazushi Yamauchi, Yamato (JP); Kaoru Kusafuka, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 09/791,963

(22) Filed: Feb. 23, 2001

(65) Prior Publication Data

US 2001/0026258 A1 Oct. 4, 2001

(30) Foreign Application Priority Data

Feb. 25, 2000 (JP) ............................ 2000-050048

(51) Int. Cl.
*G09G 5/02* (2006.01)
*G02F 1/1333* (2006.01)

(52) U.S. Cl. ...................... 345/695; 345/694; 349/105; 349/110

(58) Field of Classification Search ........ 345/694–698, 345/89, 88, 95, 90, 85, 149, 55, 690, 613, 345/614, 152, 211–212, 99; 349/108–110, 349/106, 173, 85, 105; 430/5
See application file for complete search history.

(56) References Cited

U.S. PATENT DOCUMENTS 4,941,736 A * 7/1990 Taniguchi et al. .......... 349/173
5,552,911 A * 9/1996 Okada et al. ............... 349/106
5,654,732 A * 8/1997 Katakura ..................... 345/95
5,719,651 A * 2/1998 Okada et al. ................. 345/85
5,725,975 A * 3/1998 Nakamura et al. ............. 430/5
5,751,272 A * 5/1998 Silverbrook et al. ........ 345/149
5,808,594 A * 9/1998 Tsuboyama et al. .......... 345/89
5,959,602 A * 9/1999 Welzen ........................ 345/99
5,973,657 A * 10/1999 Okada et al. ................. 345/89
6,008,868 A * 12/1999 Silverbrook ................. 345/88
6,014,193 A * 1/2000 Taira et al. .................... 345/90
6,100,861 A * 8/2000 Cohen et al. ................. 345/88
6,414,664 B1 * 7/2002 Conover et al. .............. 345/89
6,498,592 B1 * 12/2002 Matthies ...................... 345/55
6,529,213 B1 * 3/2003 Kimura ...................... 345/696
6,714,212 B1 * 3/2004 Tsuboyama et al. ........ 345/696

FOREIGN PATENT DOCUMENTS

JP 02-166419 6/1990
JP 02-184812 7/1990
JP 03-039717 2/1991
JP 04-276715 10/1992
JP 06-301357 10/1994
JP 07-334128 12/1995
JP 11-311971 11/1999

* cited by examiner

*Primary Examiner*—Bipin Shalwala
*Assistant Examiner*—David L. Lewis
(74) *Attorney, Agent, or Firm*—Ido Tuchman; E. Dwayne Nelson

(57) ABSTRACT

An image display device for multi-gray scale display includes a first pixel for transmitting an achromatic color light therethrough with a first transmittance and a second pixel for transmitting the achromatic color light therethrough with a second transmittance different from the first transmittance of the first pixel. In this case, for video data to be entered, gray scale display allowed with the first transmittance of the first pixel and gray scale display allowed with the second transmittance of the second pixel are combined, to display the gray scale of the video data.

11 Claims, 4 Drawing Sheets

IMAGE DISPLAY DEVICE AND METHOD FOR DISPLAYING MULTI-GRAY SCALE DISPLAY

BACKGROUND OF THE INVENTION

The present invention relates to a display system for a liquid crystal display (LCD) device, and more particularly to a method and a mechanism for expanding the number of gray scale levels in the LCD device.

There has been a tendency in recent years to immediately imagine color display when a liquid crystal display (LCD) device is considered. Actually, with regard to an LCD module used for an LCD monitor or the like, one using a so-called 8-bit/color source driver for displaying red (R), green (G) and blue (B) by 8-bit data has been widespread. Such an LCD module can perform multi-gray scale display of $2^8$=256 levels for one color. For the entire colors of R. G and B, $(2^8)^3$=16 M (approximately 16 million) colors can be displayed.

On the other hand, color display is not always necessary for the use of the display. Monochrome display may be enough or even better. There may also be a case where higher resolution and more gray scale levels are requested. A display device for medical use is a typical example. For such a special purpose, a CRT monitor capable of performing monochrome display with high resolution and many gray scale levels has conventionally been used. In general, such a monochrome CRT monitor can receive and display 12-bit data from a graphics adapter of a host system, i.e., data capable of displaying gray scale of $2^{12}$ levels. Accordingly, the LCD display must have a capability of displaying gray scale of the same levels.

The market of monochrome monitors is very attractive to LCD module/monitor manufacturers, and it is only natural that they consider the possibility of making a monochrome LCD monitor the replace for a monochrome CRT monitor. Nowadays, especially in LCD monitors having ultra high resolutions, such as QXGA (Quad Extended Graphics Array) (2048×1536 dots), or the QUXGA (Quad Ultra Extended Graphics Array) (3200×2400 dots), the limitation of CRTs can be greatly exceeded in a pixel pitch. For example, in the case of a 20.8 inch LCD monitor based on QXGA, pixel pitches are as follows:

Horizontal: (4/5) 20.8 25.4/2048=0.20637

Vertical: (3/5) 20.8 25.4/1536=0.20637

The pitches are about 206 micrometers for both horizontal and vertical lines. These pitches for character display are too fine to human eyes (best pixel pitches for character display are considered to be about 300 micrometers), but 206 micrometers is considered to be a value suitable for graphics display.

Thus, there are no problems for the use of a LCD monitor in high resolution requirements. However, there exists a great problem in the number of gray scale levels to be displayed. Specifically, for example, in the case of the monochrome LCD monitor, unless $2^{12}$ or more gray scale levels are provided, the replacement of the CRT monitor by the LCD monitor may lose its attraction to the user, and may even be abandoned. Accordingly, it is an important task to realize the monochrome LCD monitor having many gray scale levels while providing lower costs.

Conventionally, as measures to provide more gray scale levels by a display device having the equal number of data bits, a dither method and Frame Rate Control (FRC) have been widely used.

The dither method is spatial modulation in short, which is designed to realize gray scale levels of $2^n$ or more seemingly by, for example, entering data of n+2 bits from a host system to a display device originally having the data bit number of n bits, and performing spatial modulation for the original gray scale value of its pixel represented with upper n bits by using lower 2 bits.

Another method called FRC is time modulation in short, which is designed to seemingly increase the number of gray scale levels by performing modulation for each frame in this case (i.e., adding +1 or −1 to its original gray scale value) by using bits also expanded to the lower side.

It is possible to use the dither method and the FRC in combination. For example, Japanese Patent Laid-Open No. Hei 3-39717 discloses a technology for performing multi-gray scale display by dividing each display pixel of a liquid crystal display device into four portions, and then increasing the number of display gray scale levels thereof when each display pixel is displayed. A similar technology for using the dither method and the FRC is also disclosed in Japanese Patent Laid-Open No. Hei 6-301357.

However, the use of the foregoing dither method requires the sacrifice of resolution to increase gray scale. Consequently, it is impossible to attain a high resolution. The use of the FRC causes a difference in luminance between frames, and flickering on the screen becomes conspicuous depending on a displayed pattern, resulting in degradation of image quality. In addition, the foregoing disclosed technology is designed only to combine the dither method and the FRC and, thus, the above problems still remain to be solved. A practical rate of increase made in the number of gray scale levels by employing the dither method and the FRC is only about $2^2$ to $2^3$. Even in the case of the display device of 8-bit/color, the total number of gray scale levels is limited to at most $2^{10}$ to $2^{11}$, which is far less than the number $2^{12}$ (=4096) of gray scale levels presented by the currently used monochrome CRT.

Now, consideration is given to the case of performing monochrome display by simply removing a color filter (e.g., omitting a color filer generation process) from a generally used color thin-film transistor (TFT) LCD panel and the like. In this case, original three pixels corresponding to R, G and B can be considered to be one pixel of monochrome display. In the case of 8-bit color, while the gray scale values of these three subpixels are increased from (m, m, m) to (m+1, m+1, m+1) ($0 \leqq m \leqq 2^8-1$), two luminance levels of (m, m+1, m+1) and (m, m, m+1) can be employed. At this time, (m, m, m+1), (m, m+1, m) and (m+1, m, m) are considered to have equal luminance levels, and thus these cannot be distinguished from each other. The same applies to (m, m+1, m+1), (m+1, m, m+1) and (m+1, m+1, m). As a result, the number of gray scale levels to be displayed is 3 $(2^8)$−2=766.

The foregoing content will be further described. It is assumed that the luminance of each of portions originally called R, G and B is N. The sum total of these luminances is 3N. Preconditions are that each portion can be displayed by 8-bit/color, i.e., by $2^8$=256 gray scale levels, and that a gamma characteristic between luminance and a gray scale value can be represented by a linear function, assuming that black is 0. In this case, the gray scale levels of R, G and B can be respectively represented in 0, N/255, 2N/255, . . . and 255N/255. By combining R, G and B, display can be made at the gray scales of 0, N/255, 2N/255, . . . and 765N/255.

Accordingly, the number of gray scale levels becomes 766. In other words, even in the case of monochrome display realized by removing the color filter from the color LCD panel, the total number of gray scale levels using the display device of 8-bit/color is far less than $2^{10}$.

SUMMARY OF THE INVENTION

The present invention was made in order to solve the foregoing technical problems, and an object of the present invention is to increase the number of gray scale levels to be displayed in a liquid crystal display device.

In order to achieve the foregoing object, a feature according to the present invention includes an image display device for a multi-gray scale display. The image display device includes a first pixel for transmitting an achromatic color light therethrough with a first transmittance and a second pixel for transmitting the achromatic color light therethrough with a second transmittance different from the first transmittance of the first pixel. In this case, for video data to be entered, gray scale display allowed with the first transmittance of the first pixel and gray scale display allowed with the second transmittance of the second pixel are combined, to display the gray scale of the video data.

Another feature of the present invention is a liquid crystal display device. The liquid crystal display device includes a black matrix formed of a film having a good light shielding characteristic, a first pixel for transmitting a light through a first aperture thereof, which is uncovered with the black matrix, and a second pixel for transmitting a light through a second aperture which is uncovered with the black matrix and is different from the first aperture in size. In this case, the light transmitted through the first pixel and the light transmitted through the second pixel are combined, to display the gray scale.

Another feature of the present invention includes a liquid crystal display device having a light source for supplying a light, a liquid crystal structure having a thin-film transistor structure formed for each subpixel and for transmitting a light from the light source, and a black matrix, which partitions the subpixels, having an aperture for transmitting a light from the liquid crystal structure therethrough, and formed of a light shielding film structure having the aperture changed in size corresponding to a particular subpixel.

Still another feature of the present invention includes a liquid crystal display device for displaying the gray scale of one pixel image with a plurality of subpixels having a first subpixel for performing predetermined gray scale display with a first light quantity, a second subpixel for performing gray scale display with a second light quantity having a lower/upper limit different from that of the first light quantity of the first subpixel. The liquid crystal display further includes a control unit for performing control to display the gray scale of the pixel image of entered image data by combining the first and second subpixels.

Yet another feature of the present invention is a method of displaying an image for outputting entered multi-gray scale monochrome image data to a liquid crystal cell. The method includes the steps of: storing the output relation of gray scale display made for an entered pixel value by combining the gray scale of a first subpixel having a first maximum output light quantity and the gray scale of a second subpixel having a second maximum output light quantity; and deciding output values of the first and second subpixels for one pixel value in the entered monochrome image data based on the stored output relation, and outputting the values to the liquid crystal cell.

Still another feature of the present invention is an image display method for displaying the gray scale of one pixel image having a plurality of subpixels. The method includes the steps of: preparing a subpixel having a lower/upper limit light quantity made different among the plurality of subpixels allowing predetermined gray scale display to be performed; and performing multi-gray scale display by combining the subpixel having the lower/upper limit light quantity made different with the other subpixels.

For a more complete understanding of the present invention and the advantages thereof, reference is now made to the following description taken in conjunction with the accompanying drawings.

DETAILED DESCRIPTION OF THE PREFERRED EMBODIMENTS

Figure 1:
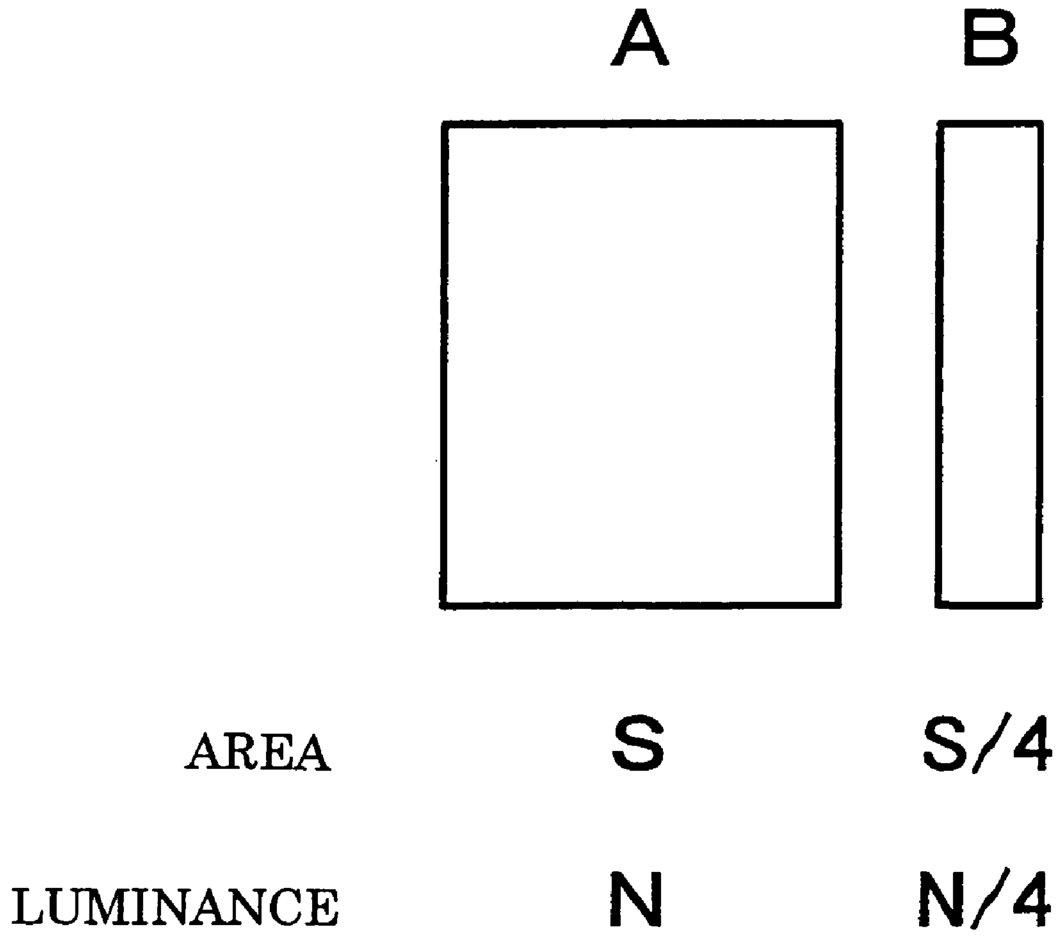
FIG. 1 is a view illustrating an aspect of a system of the invention.

The present invention is designed to greatly increase the number of gray scale levels to be displayed especially in the liquid crystal display device of a monochrome type.

The present invention is further designed to prevent the deterioration of resolution or image quality even if the number of gray scale levels is increased.

The first and second pixels are equivalent to the subpixels of a pixel. For these first and second pixels, the transmittances are set to be different from each other by changing the sizes of their apertures for light transmission. More specifically, the transmittance can be changed by changing the area of the aperture of a black matrix partitioning the pixels and having a good light shielding characteristic.

In addition, for the first and second pixels, the transmittances are set to be different from each other by coating achromatic color resists. More specifically, a gray film setting a transmittance to, for example ⅛ is coated/developed for a pixel (subpixel) targeted for different transmittance setting.

Furthermore, the combination of the first and second pixels is not necessarily limited to one-to-one combination. Optional numbers, for example two first pixels and one second pixel, can be selected for gray scale display. In this case, the combination of two first pixels and one second pixel enables the subpixels of the present invention to be disposed corresponding to respective R, G and B pixels (three subpixels) of a generally used color display device. More specifically, the respective R, G and B subpixels are changed to be monochrome and to have light transmittances set at a constant ratio (e.g., R:G:B=⅛:1:1). Accordingly, when these subpixels are combined to be one pixel, it is possible to increase the number of monochrome gray scale levels to be displayed with the pixel by at least more than $2^4$ times of that displayed with a single subpixel.

More specifically, a maximum light quantity to be outputted is changed for a particular pixel (second pixel) by changing the pattern (aperture ratio) of the black matrix. In addition, the second aperture portion of the second pixel is formed of a shielding membrane different from the black matrix.

For example, a special film structure for forming the second aperture is provided. By doing this it is not necessary to distinguish the shape of the black matrix from that in a general liquid crystal display device.

In addition, a color filter structure used for a general color liquid crystal display device is omitted, and the shielding region of the black matrix is set large for particular subpixels which are likely to constitute R, G or B when the color filter structure is film-formed. This structure enables the gray scale to be easily increased by setting a small aperture (setting a large shielding region) for, for example one color pixel (subpixel), constituting R, G and B in color.

In addition, for the second subpixel, the second light quantity is set by changing a voltage value applied thereto, and gray scale display is performed by controlling a voltage such that the second light quantity is divided into predetermined quantities. With such an arrangement, multi-gray scale display can be realized by using electric control executed for the plurality of subpixels.

The second maximum output light quantity of a second subpixel is obtained by changing a light transmittance for the first maximum output light quantity. In addition, the second subpixel has an aperture narrowed by a black matrix provided in the liquid crystal cell, is set at the second maximum output light quantity.

Furthermore, regarding the storage of the output relation, the output relation of subpixels for one pixel entered based on, for example a table form, is stored. The functions of storing such an output relation and deciding such an output value may be provided in a liquid crystal cell control circuit installed in a liquid crystal display module, or, for example, in a graphics controller LSI in a system unit for controlling the liquid crystal display module.

Furthermore, in the plurality of subpixels, a lower/upper limit light quantity is made different by changing a maximum voltage value.

Next, detailed description will be made for a liquid crystal display device of an embodiment of the present invention. First, an aspect of a method for expanding the number of gray scale levels used in the embodiment is described.

FIG. 1 illustrates an aspect of the system of the invention by taking an example of the case of combining two adjacent subpixels having different light transmittance, and using these subpixels as one pixel. An aperture A has a first light transmittance, and an aperture B has a second light transmittance. The two subpixels of the apertures A and B are combined to be treated as one pixel.

No color filters are provided in the apertures A and B. The aperture A has an area larger by four times than that of the aperture B (area A=S, and area B=S/4), and a light transmittance larger by four times than that of the aperture B, and accordingly luminance is larger by four times for the aperture A (luminance A=N, and luminance B=N/4).

In addition, a gamma curve is assumed to be represented by a linear function while luminance is 0 with black. The gray scale of four levels can be displayed in both of the apertures A and B.

In this case, the luminance of a pixel formed of one pixel combining the two subpixels of the apertures A and B can be represented by a value obtained by adding the luminances of the both. The aperture A alone allows four types of luminances, N, 2N/3, N/3 and 0 to be displayed (four gray scale level display). The aperture B alone allows four types of luminances N/4, 2N/12, N/12 and 0 to be displayed (four gray scale level display).

Combining the apertures A and B, the number of luminances displayed with one pixel is sixteen, 15N/12, 14N/12, 13N/12, 12N/12, 11N/12, 10N/12, 9N/12, 8N/12, 7N/12, 6N/12, 5N/12, 4N/12, 3N/12, 2N/12, N/12 and 0. In other words, the number of gray scale levels to be displayed is increased to sixteen. If the two subpixels are equal in area and light transmittance, then totally seven gray scale levels of 2N, 5N/3, 4N/3, N, 2N/3, N/3 and 0, can only be displayed in total. Therefore, by employing one pixel obtained by combining subpixels different in light transmittance like that of the described system, it is possible to greatly increase the number of gray scale levels.

Figure 2:
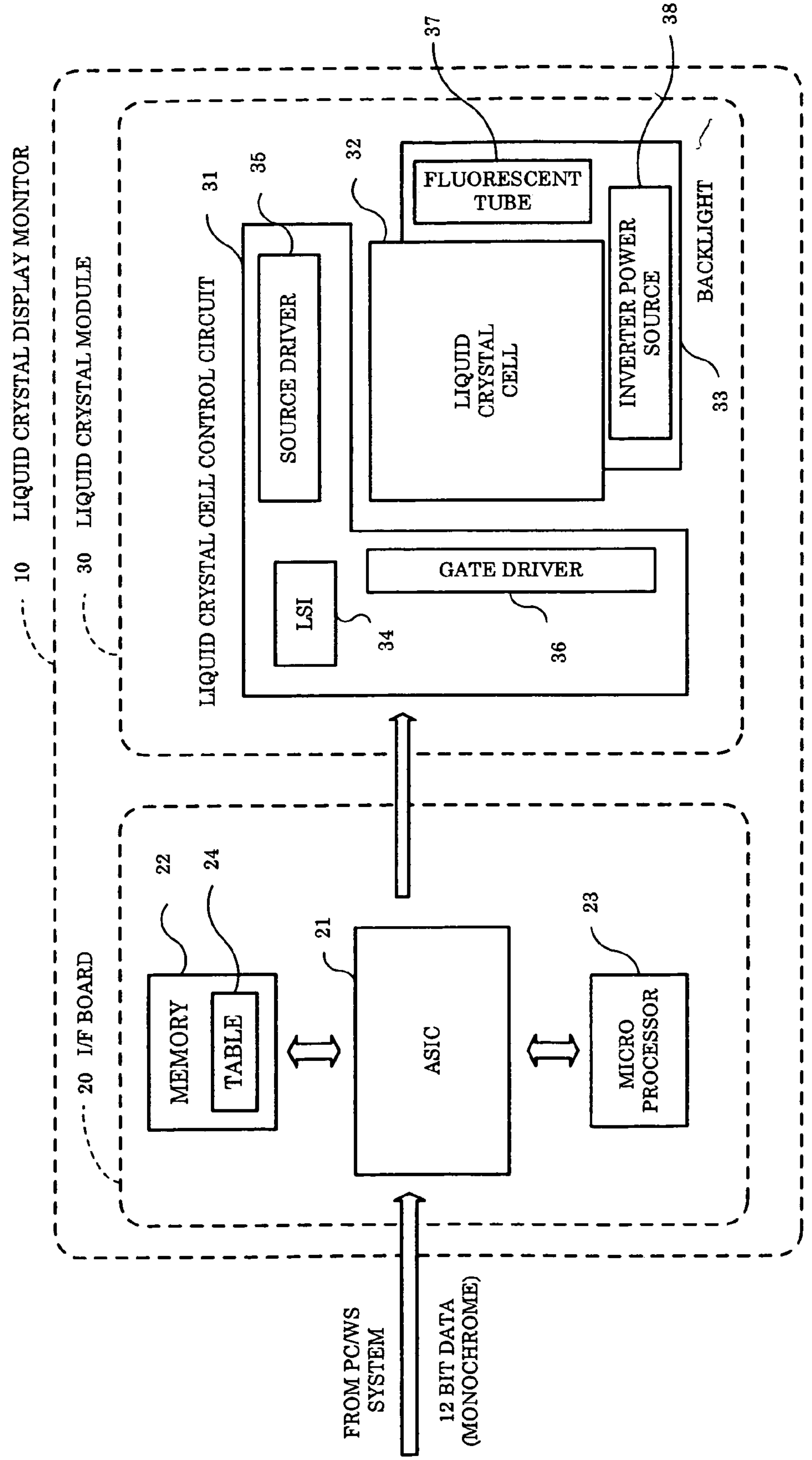
FIG. 2 is a view illustrating a liquid crystal display device of an embodiment of the invention, to which a method for expanding the number of gray scale levels is applied.

FIG. 2 illustrates the entire constitution of the liquid crystal display device, to which the method for expanding the number of gray scale levels is applied. A reference numeral 10 denotes a liquid crystal display monitor (LCD monitor) as a liquid crystal display panel. This liquid crystal display monitor 10 comprises a liquid crystal display module having, for example, a thin-film transistor (TFT) structure, and an interface (I/F) board 20 connected to a digital interface or an analog interface from a PC or WS system and provided to supply a video signal to the liquid crystal display module 30. In the case of a notebook PC, a system unit (not shown) is added to the liquid crystal display monitor 10 and, when a display device constitutes a monitor independent of a system unit, a system unit (not shown) is added to the liquid crystal display monitor 10, and thereby a liquid crystal display device is constituted.

The I/F board 20 includes an ASIC 21 having a logical circuit mounted thereon to execute various adjustments or addition for an entered video signal, a memory 22 storing various information necessary for the operation of the ASIC 21, and a microprocessor 23 provided to control the I/F board 20. In the embodiment, the memory 22 has a table 24 stored therein to decide, for example, an output value of each subpixel for the monochrome (black and white gray scale) data of 12 bits entered from a host side. In this table 24, the correlation of the output value with an input value is described so as to enable an output gray scale value to be decided in consideration of the gamma characteristic of the liquid crystal display module 30 to be connected.

The table 24 and the control function of an output voltage value based thereon can be provided in a liquid crystal cell control circuit, described hereafter, installed in a liquid crystal display module, described hereafter.

On the other hand, the liquid crystal display module 30 is roughly divided into three blocks of a liquid crystal cell control circuit 31, a liquid crystal cell 32 and a backlight 33. The liquid crystal cell control circuit 31 includes the following panel driver components: an LCD controller LSI 34, source drivers (X drivers) 35 and gate drivers (Y drivers) 36. The LCD controller LSI 34 processes a signal received from the I/F board 20 through the video interface, and outputs a signal to be supplied to each IC of the source drivers 35 and the gate drivers 36, with a necessary timing. The liquid crystal cell 32 receives voltages from the source drivers 35 and the gate drivers 36, and outputs images on a TFT array in a matrix form. The backlight 33 includes fluorescent tubes 37 to be lit by an inverter power source 38. This backlight 33 is disposed in the backside or side of the liquid crystal cell 32 to project a light from the backside of the liquid crystal cell. Only a so-called transmission type liquid crystal display module is provided with such a backlight 33. Normally, the backlight 33 is not provided in a reflection type liquid crystal display module, because an external light is reflected to be used as a light source.

The liquid crystal cell 32 composed of a TFT usually includes an RGB color filter provided for color display. In this color filter, R, G and B are arrayed (arranged) by a stripe array, a mosaic array, a delta (triangle) array or the like, and one pixel is displayed by using TFT pixels respectively corresponding to R, G, and B as subpixels and performing spatial modulation by means of the three subpixels. However, in the described embodiment, such a color filter is omitted from the liquid crystal cell 32, and thus provides a monochrome TFT-LCD monitor. In addition, the liquid crystal cell 32 normally includes a black matrix (BM) provided to improve contrast and to prevent light leakage from between the adjacent pixels and the irradiation of an external light on the TFT. In the embodiment, however, the pattern of the black matrix is partially changed so that pixel aperture areas for the respective subpixels are made different from each other.

Figure 3:
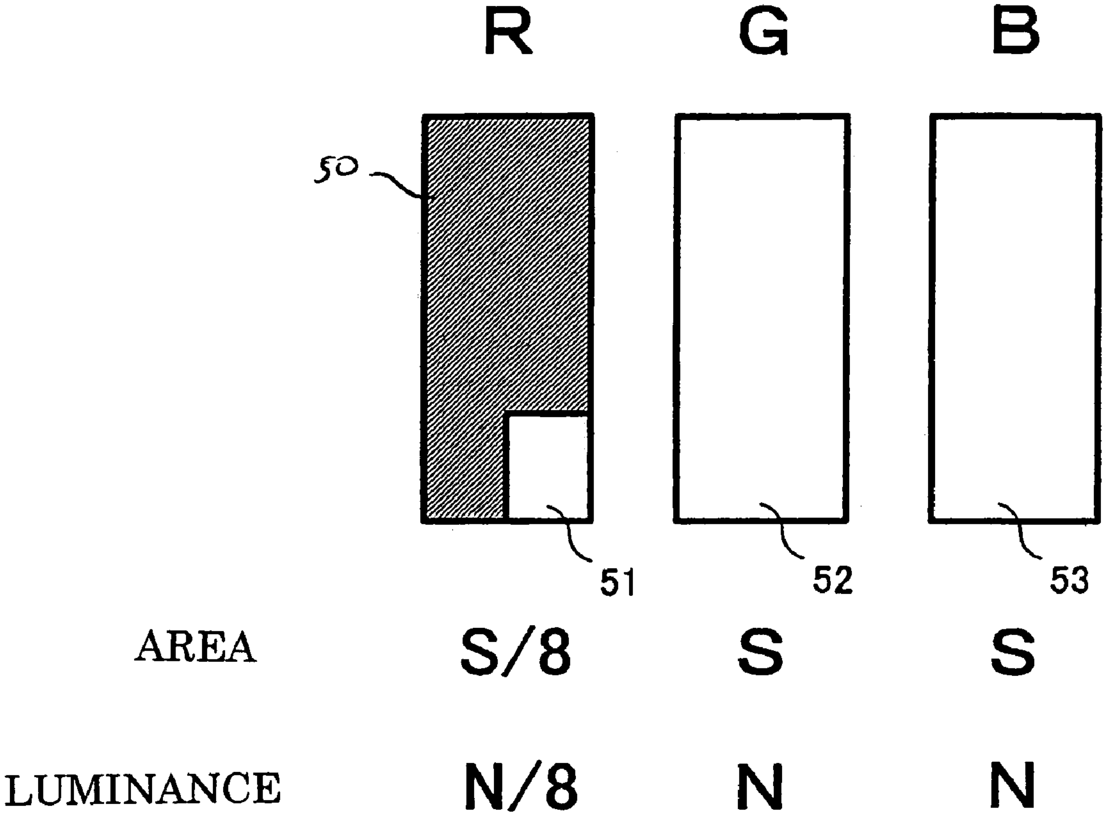
FIG. 3 is a view illustrating each pixel of a liquid crystal cell of the embodiment.

FIG. 3 illustrates each pixel of the liquid crystal cell 32 of the embodiment. In the embodiment, the color filter is omitted as described above, and a subpixel 51 is formed by changing the pattern of the black matrix 50 for the subpixel originally set in an R array. Subpixels 52 and 53 indicate pixels originally set in the G and B arrays. In this case, by the black matrix 50, the pixel aperture areas of the subpixels 51, 52 and 53 are set respectively at S/8, S and S. At this time, the luminances of the subpixels 51, 52 and 53 are respectively N/8, N and N, and the sum total of the luminances is 2N+N/8=17N/8. Preconditions to be satisfied are that each of the subpixels can be displayed with gray scale levels of $2^8$=256, and the gamma curve is assumed to be represented by a linear function while luminance is 0 with black.

The gray scales of the subpixels 52 and 53 can be displayed by 0, N/255, 2N/255, . . . , 255N/255. As a result, by combining the subpixels 52 and 53, display by the gray scale levels of 0, N/255, 2N/255, . . . , 510N/255 can be realized.

On the other hand, the gray scales of the subpixel 51 can be displayed by 0, N/(255×8), 2N(255×8), . . . , 255N/(255×8).

Then, by combining all the subpixels 51, 52 and 53, display with the gray scale levels of 0, N/(255×8), 2N/(255×8), . . . , (510×8)N/(255×8), . . . , [(510×8)+255]N/(255×8) can be realized.

Therefore, the total number of gray scale levels becomes [(510×8)+255]+1=4336. This number exceeds $2^{12}$=4096 set when the user requests gray scale levels of $2^{12}$.

Luminance of the liquid crystal cell in this case is only ⅔ ((17N/8)÷3N=17/24) of that of the liquid crystal cell having a color filter omitted therefrom.

Now, consideration is also given to the extreme case of increasing the number of gray scale levels as much as possible irrespective of any reductions in luminance by using the described system.

If two optional light transmittances (aperture area or the like) in the subpixels of R, G and B are set at, for example, $1/2^8$ and $1/2^{16}$, display is allowed up to the gray scale levels of $2^{24}$=16777216 in theory. In this case, however, luminance becomes only about ⅓ of that of the liquid crystal cell having the color filter omitted. In other words, a trade-off relation is set between the number of gray scale levels and a luminance reduction. A problem then is the number of gray scale levels required by the user. In other words, it is ideal to suppress a luminance reduction as much as possible while increasing the number of gray scale levels efficiently to such a degree that the minimum number of gray scale levels required by the user is just about exceeded. For example, if the number of gray scale levels requested by the user is $2^{12}$, then the example described above with reference to FIG. 3 is sufficient.

As described above, according to the embodiment, the process of forming the color filter used for the typical TFT-LCD panel is not performed and, by changing the aperture ratio of any one of the subpixels of the original R, G and B arrays, the number of monochrome gray scale levels to be displayed with the subpixels is increased. In other words, the foregoing description enables the number of gray scale levels to be greatly increased by adding changes to the conventional TFT-LCD panel, and it is possible to provide a multi-gray scale monochrome LCD as would be much requested by a user.

The embodiment has been described by taking the example of changing the aperture ratio by partially changing the pattern of the black matrix 50, but membranes other than the black matrix can be used for a portion equivalent to the shielding portion of the aperture. The example of reducing the aperture area to ⅛ has also been described. However, instead of shielding the aperture, a light can be passed having a constant transmittance. For example, a light transmittance may be set like that in the foregoing example by coating/developing a special achromatic color resist to allow the passage of an achromatic color (gray) light having a transmittance of ⅛. In this case, also transmittance should preferably be decided in consideration of a nonlinear gamma characteristic.

One pixel can be composed of a plurality of subpixels not by changing the light transmittance of any one of the subpixels of the original R, G and B arrays, but by disposing subpixels different in size beforehand. In this case, designing can be carried out to secure the maximum luminance from the beginning, and it is possible to provide a multi-gray scale and bright LCD panel.

Furthermore, instead of changing the light transmittance of the aperture, the number of gray scale levels may be increased by, for example, performing voltage control in the liquid crystal cell control circuit 31 to set the maximum luminance of the R array at ⅛. In other words, this is a method of changing the R array from, e.g., 0 to E/8(V) while the G and B arrays are changed from, e.g., 0 to E(v). In the case of a TN mode liquid crystal cell often used in the liquid crystal display device of a notebook type or a monitor, the maximum voltage amplitude (dynamic range) of each subpixel is about 10V. In the case of an IPS mode liquid crystal cell often used in the liquid crystal display device of a monitor type, required maximum voltage amplitude (dynamic range) of each subpixel may be about 15V. A similar effect can be obtained by setting the maximum voltage at about ⅛ for, among the subpixels, for example, the subpixel of the R array, and displaying gray scale levels within the maximum voltage. In practice, however, an output characteristic is decided in consideration of a nonlinear gamma curve.

The first embodiment was described by focusing on the technology for achieving high gray scale in the monochrome LCD panel. In another embodiment, however, high gray scale is achieved in a color LCD panel.

Figure 4:
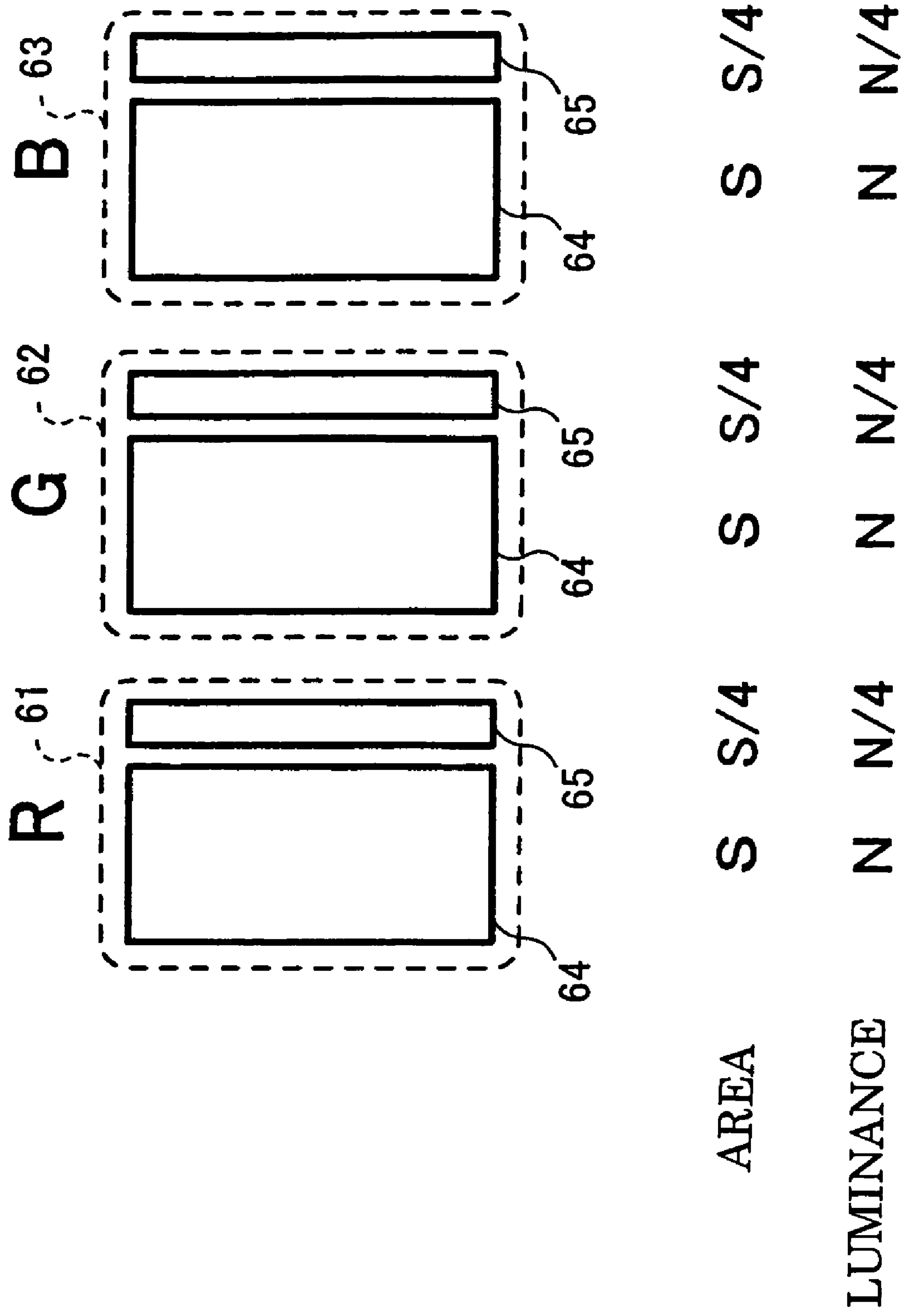
FIG. 4 is a view illustrating a liquid crystal cell of a second embodiment of the invention.

FIG. 4 illustrates the construction of a liquid crystal cell according to another embodiment. An arrangement is made by disposing the color filters of respective colors for a subpixel 61 as a color array of R, a subpixel 62 as a color array of G, and a subpixel 63 as a color array of B, and each of the subpixels 61, 62 and 63 is composed of least significant subpixels 64 and 65. In other words, one pixel is made by combining the subpixels 61, 62 and 63, and each of the subpixels 61, 62 and 63 also has a plurality of least significant subpixels 64 and 65.

The least significant subpixel 65 has an aperture area of ¼ the size of that of the least significant subpixel 64, and a light transmittance is also set at ¼. In addition, it is assumed that a gamma curve has a luminance 0 when no lights are transmitted, and can be represented by a linear function. The least significant subpixels 64 and 65 can respectively display four gray scale levels.

In this case, the luminance of a pixel composed of the subpixels 61, 62 and 63 combined by the two least significant subpixels 64 and 65 can be displayed with a value obtained by adding the luminances of the least significant subpixels 64 and 65. The least significant subpixel 64 alone allows a luminance to be displayed at four gray scale levels of N, 2N/3, N/3 and 0 (four gray scale level display) if its maximum luminance is N. The least significant subpixel 65 alone allows a luminance to be displayed at four gray scale levels of N/4, 2N/12, N/12 and 0 (four gray scale level display). In this case, for example, one subpixel 61, by combining the least significant subpixels 64 and 65, enables a luminance to be displayed at sixteen gray scale levels of 15N/12, 14N/12, 13N/12, 12N/12, 11N/12 10N/12, 9N/12, 8N/12, 7N/12, 6N/12, 5N/12, 4N/12, 3N/12, 2N/12, N/12 and 0 in total. In other words, the number of gray scale levels to be displayed for each subpixel formed of each color can be increased to sixteen.

In the embodiment, as described above, the least significant subpixels 64 and 65 different in light transmittance and are disposed for each of the subpixels 61, 62 and 63 as the color arrays of R, G and B. As a result, according to the embodiment, it is possible to increase gray scale for each color, and to perform high gray scale display in the color LCD panel.

As apparent from the foregoing, according to the present invention, it is possible to increase the number of gray scale levels in the liquid crystal display device. In particular, it is possible to greatly increase the number of gray scale levels to be displayed in the liquid crystal display device of a monochrome type.

Although the preferred embodiments of the present invention have been described in detail, it should be understood that various changes, substitutions and alternations can be made therein without departing from spirit and scope of the inventions as defined by the appended claims.

We claim:

1. An image display device for multi-gray scale display, comprising:

a first pixel for transmitting an achromatic color light therethrough with a first transmittance; and a second pixel for transmitting the achromatic color light therethrough having a second transmittance being different from the first transmittance of the first pixel, wherein gray scale display allowed with the first transmittance of the first pixel and gray scale display allowed with the second transmittance of the second pixel are combined for video data to be entered, to display gray scale of the video data, and wherein transmittances of the first and second pixels are set to be different from each other by changing sizes of apertures thereof for light transmission.

2. An image display device for multigray scale display, comprising:

a first pixel for transmitting an achromatic color light therethrough with a first transmittance;

a second pixel for transmitting the achromatic color light therethrough having a second transmittance being different from the first transmittance of the first pixel;

wherein gray scale display allowed with the first transmittance of the first pixel and gray scale display allowed with the second transmittance of the second pixel are combined for video data to be entered, to display gray scale of the video data; and wherein transmittances of the first and second pixels are set to be different from each other by coating achromatic color resists.

3. A liquid crystal display device for displaying gray scale of one pixel image by a plurality of subpixels, comprising:

a first subpixel for performing predetermined gray scale display with a first light quantity;

a second subpixel for performing gray scale display with a second light quantity having a lower/upper limit different from that of the first light quantity of the first subpixel; and a control unit for performing control to display gray scale of a pixel image of entered image data by combining the first and second subpixels, the control unit configured to provide different maximum drive voltages to the first and second subpixels.

4. The liquid crystal display device according to claim 3, wherein the lower/upper limit of the second light quantity of the second subpixel is set by changing a voltage value applied thereto, and gray scale display is performed by controlling a voltage value such that the second light quantity is divided into predetermined quantities.

5. An image displaying method for outputting entered multigray scale monochrome image data to a liquid crystal cell, comprising the steps of:

storing an output relation of gray scale display made for an entered pixel value by combining gray scale of a first subpixel having a first maximum output light quantity and gray scale of a second subpixel having a second maximum output light quantity; and deciding output values of the first and second subpixels for one pixel value in the entered monochrome image data based on the stored output relation, and outputting the values to the liquid crystal cell.

6. The image displaying method according to claim 5, wherein the method further comprises the step of changing light transmittance for the first maximum output light quantity, whereby a second maximum output light quantity of the second subpixel is obtained.

7. The image displaying method according to claim 5, wherein the method further comprises the steps of providing the second subpixel with an aperture narrowed by a black matrix provided in the liquid crystal cell, and setting the second subpaxel at the second maximum output light quantity.

8. An imagedisplaying method for displaying gray scale of one pixel image by a plurality of subpixels, comprising the steps of:

preparing a subpixel having a lower and an upper limit light quantity made different among the plurality of subpixels to allow predetermined gray scale display, the subpixel having a different aperture size than the plurality of subpixels; and performing multi-gray scale display by combining the subpixel having the lower and upper limit light quantities made different with other subpixels.

9. The image displaying method according to claim 8, wherein the method further comprises the step of changing a maximum voltage value for the lower and upper limit light quantities for the plurality of subpixels.

10. An image display device for multi-gray scale display, comprising:

a first pixel for transmitting an achromatic color light therethrough with a first transmittance;

a first aperture for light transmittance of the first pixel;

a second pixel for transmitting the achromatic color light therethrough having a second transmittance being different from the first transmittance of the first pixel; and a second aperture for light transmittance of the second pixel, wherein the size of the second aperture is different than the size of the first aperture.

11. An image display device for multigray scale display, comprising:

a first pixel for transmitting an achromatic color light therethrough with a first transmittance;

a first achromatic color resist for light transmittance of the first pixel;

a second pixel for transmitting the achromatic color light therethrough having a second transmittance being different from the first transmittance of the first pixel; and a second achromatic color resist for light transmittance of the second pixel, wherein the transmittance the second achromatic color resist is different than the transmittance of the first achromatic color resist.

* * * * *